Aug. 8, 1933.  C. P. HOWARD ET AL  1,921,525
BALL HANDLE
Filed Nov. 15, 1930   2 Sheets-Sheet 1
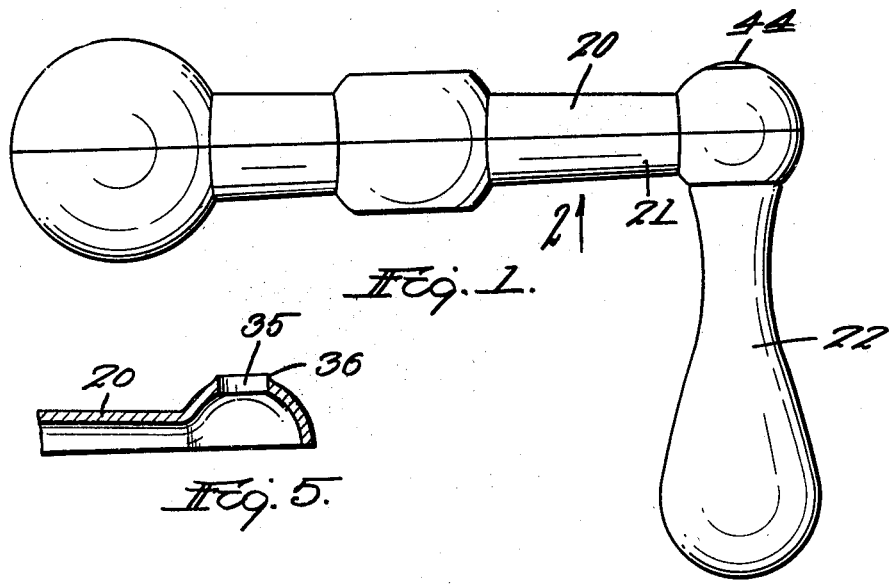
Fig. 1.
Fig. 5.
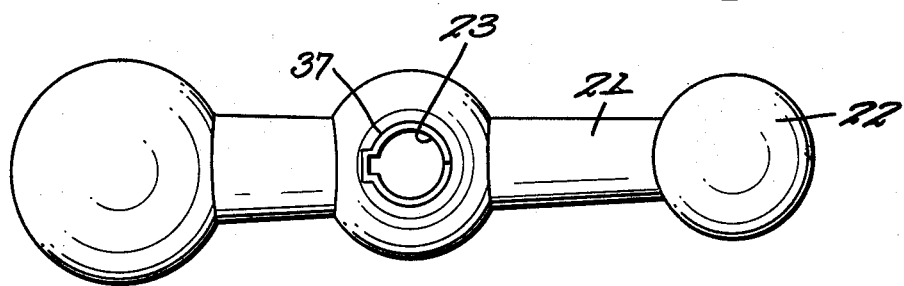
Fig. 2.
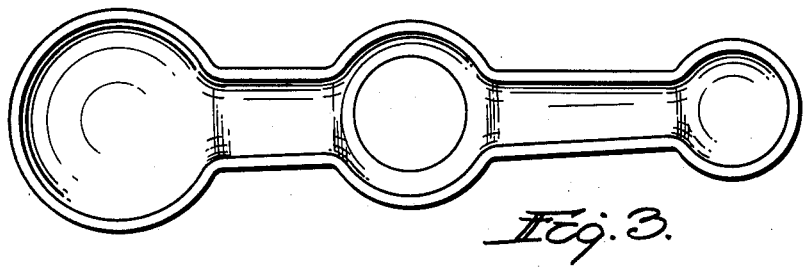
Fig. 3.
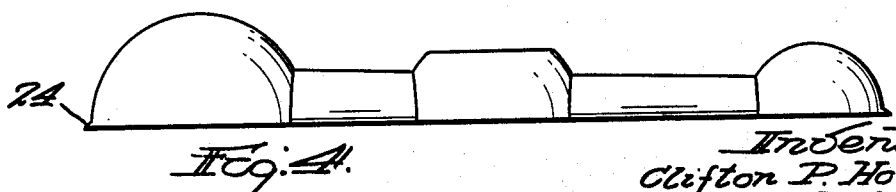
Fig. 4.
Inventors
Clifton P. Howard
Peter Lofgren
By Attorneys
Southgate Hayr Hawley

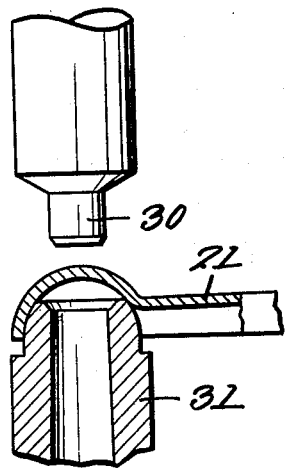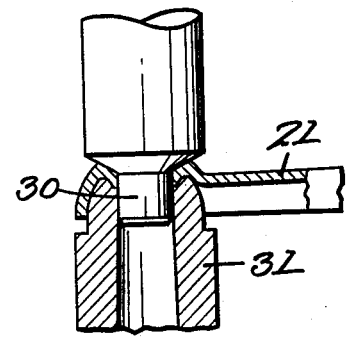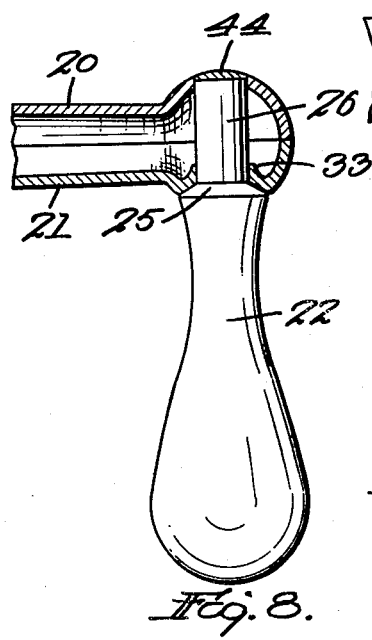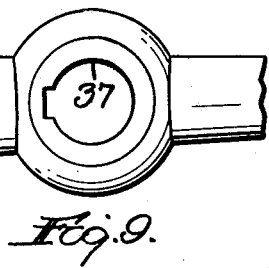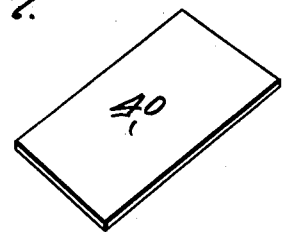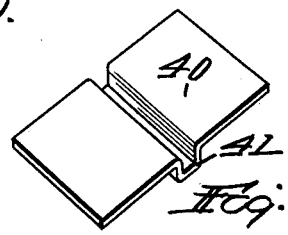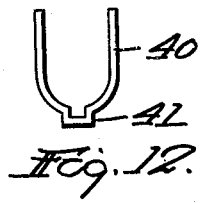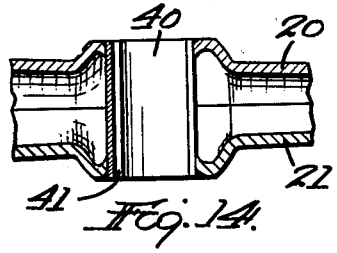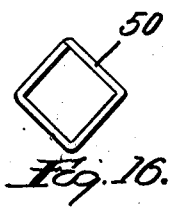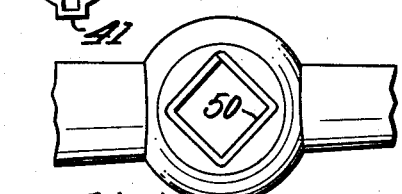

Patented Aug. 8, 1933

1,921,525

UNITED STATES PATENT OFFICE 1,921,525

BALL HANDLE

Clifton P. Howard and Peter Lofgren, Worcester, Mass., assignors to Rockwood Sprinkler Company of Massachusetts, a Corporation of Massachusetts Application November 15, 1930
Serial No. 495,950

5 Claims. (Cl. 16—111)

This invention relates to a handle of the ball type suitable for use on the cross feed screw in a lathe or other machine tool and for many other similar purposes.

It is the object of our invention to provide a sheet metal ball handle of an improved construction, so designed that it is particularly well adapted to its intended purposes.

An important feature of the invention relates to the provision of an improved bearing member, by which the handle may be attached to a keyed or non-circular shaft. A further feature relates to an improved construction by which the hand piece may be securely seated in the handle body.

Our invention further relates to arrangements and combinations of parts which will be hereinafter described and more particularly pointed out in the appended claims.

Two forms of the invention are shown in the drawings, in which

Figure 1 is a front elevation of a ball handle embodying our improvements;

Fig. 2 is a bottom view, looking in the direction of the arrow 2 in Fig. 1;

Fig. 3 is a plan view of a partially formed handle member;

Fig. 4 is a side elevation of the part shown in Fig. 3;

Fig. 5 is a detail sectional view to be described;

Figs. 6 and 7 are detail elevations showing the method of forming the seat for the hand-piece;

Fig. 8 is a detail sectional view showing the manner of securing the hand piece in the body of the handle;

Fig. 9 is a plan view of the middle portion of one of the body members;

Figs. 10, 11, 12 and 13 are detail views showing various steps in forming a bearing member for use with a keyed shaft;

Fig. 14 is a detail sectional elevation showing the manner of securing the bearing member in place in the handle body;

Figs. 15 and 16 are detail views showing the method of forming a bearing member of rectangular cross section; and Fig. 17 is a detail plan view showing the rectangular bearing member in position in a handle body.

Referring to the drawings, we have shown our improved ball handle as comprising body members 20 and 21, a hand piece 22 and a bearing member 23 (Fig. 2). Preferably the entire article is formed from sheet metal but the method of forming the hand piece 22 forms no part of our present invention and this hand piece may be of hollow construction and formed from solid metal if preferred.

In forming our improved handle, we take flat sheet metal blanks of suitable outline and submit them to a press operation by which they are given the conformation indicated in Figs. 3 and 4, each such blank being adapted to form one-half of the body portion of a complete handle. A slight flash or fin 24 is preferably formed around these parts to facilitate welding.

An important feature of our invention relates to the provision for seating and securing the hand piece 22 in the assembled body portions 20 and 21. It is desirable in manufacturing the hand pieces 22, especially when made from sheet metal, that an inclined shoulder 25 be provided between the main portion of the hand piece and the reduced extension 26.

To provide an effective seat for this inclined shoulder 25, the smaller end of the body member 21 is submitted to the punching and pressing operation indicated in Figs. 6 and 7. In this operation, the end portion of the member 21 is first pierced by the end 30 of a special punch, and the portion surrounding the pierced opening is then depressed, as indicated in Fig. 7, providing a seat for the shoulder 25 of the hand piece 22 which conforms closely to the conical shape thereof.

The die 31 which is used in this operation is so shaped that a portion of the metal is forced inward to provide an inwardly projecting lip or ring 33 (Fig. 8) which increases the supporting surface in contact with the hand piece extension 26.

The hand piece is thus firmly seated in close contact with the body member 21 and a smooth and inconspicuous joint is attained. The corresponding end of the member 20 is similarly provided with a hole 35 punched therethrough. Preferably a thin flash or burr 36 is formed at the outer side to facilitate welding.

The middle portion of each member 20 or 21 is punched out to provide a non-circular opening 37 (Fig. 9) to receive a special transverse bearing member, which may be of any preferred cross section to correspond to the shaft on which the handle is to be used.

In Figs. 10 to 13 we have shown the various steps in forming a bearing member for a keyed shaft. A rectangular blank 40 (Fig. 13) is first pressed into the shape shown in Fig. 11, thus providing a key-way 41, and is then bent by successive pressing operations to the U-shaped form shown in Fig. 12 and to the finished circular form shown in Fig. 13, with the key-way 41 projecting at one side thereof.

In assembling the parts, the body members 20 and 21 are assembled face to face and are securely welded together in this assembled relation. The bearing member 40 is then inserted in the openings 37 and is welded in this position by flowing metal around the ends of the member 40. Preferably the middle of each body member is slightly depressed in forming the opening 37, so as to provide a slight space to receive a portion of the welding metal, as clearly indicated in Fig. 14.

The hand piece 22 is then inserted through the openings in the body members 20 and 21 and metal is flowed into the space at the end of the projection 26, as indicated at 44 in Fig. 8, building the surface up so that a perfect spherical surface may be provided by subsequent grinding and polishing.

A handle thus constructed is relatively light in weight but of ample strength and is adapted to be readily plated or polished and will take a high finish.

Where the handle is to be used on a square or rectangular shaft instead of a keyed shaft, we provide a special bearing member 50 which may be produced from a flat blank similar to the blank shown in Fig. 10. The blank is first formed to the general U-shape shown in Fig. 15 and is then bent to the completed form shown in Fig. 16. In Fig. 17 we have shown this rectangular type of bearing member assembled in a handle, in which it is secured in the same manner as has been previously described.

Having thus described our invention and the advantages thereof, we do not wish to be limited to the details herein disclosed, otherwise than as set forth in the claims, but what we claim is:—

1. A ball handle comprising two sheet metal body members secured together face to face and having aligned non-circular openings therein, and a sheet metal transverse bearing member extending through said openings and permanently secured therein, said bearing member having walls of substantially uniform cross section and being adapted to fit closely on a non-circular shaft element.

2. A ball handle comprising two sheet metal body members secured together face to face, and a hand piece having a reduced end portion and a substantially conical seating portion, said body members having end portions displaced outwardly to form parts of ball ends and the middle part of one such displaced end portion being depressed inwardly and pierced to receive said reduced end portion and to provide a seat for said conical seating portion.

3. A ball handle comprising two sheet metal body members secured together face to face and having aligned non-circular openings therein, and a sheet metal transverse bearing member extending through said openings and permanently secured therein, said bearing member having walls of substantially uniform cross section and being adapted to fit closely on a non-circular shaft element, the metal adjacent said non-circular openings being slightly depressed around said bearing member and providing external recesses to be filled with welding metal when the parts are assembled.

4. A ball handle comprising two sheet metal body members secured together face to face, and a hand piece having a reduced end portion and a substantially conical seating portion, said body members having end portions displaced outwardly to form parts of ball ends and the middle part of one such displaced end portion being depressed inwardly and pierced to receive said reduced end portion and to provide a seat for said conical seating portion, said inwardly depressed portion having a lip extending continuously around the pierced opening therein and at the inside thereof, whereby an increased bearing surface for said hand piece is provided.

5. A ball handle comprising a hand-piece having a reduced end portion and a substantially conical seating portion, a sheet metal transverse bearing member and two sheet metal body members secured face to face and having aligned non-circular openings through which said transverse bearing member extends and in which said bearing member is permanently secured, and said body members also having end portions displaced outwardly to form parts of ball ends, with the middle part of one such displaced end portion depressed inwardly and pierced to receive said reduced end portion of said hand-piece and to provide a seat for the conical seating portion of said hand piece.

CLIFTON P. HOWARD.
PETER LOFGREN.